United States Patent [19]

Kamangar

[11] 3,736,905
[45] June 5, 1973

[54] ARTIFICIAL RUMEN STIMULATOR AND METHOD OF ADMINISTERING SAME

[76] Inventor: Parviz Kamangar, 11740 Berrysessa Road, San Jose, Calif.

[22] Filed: Aug. 2, 1971

[21] Appl. No.: 168,336

[52] U.S. Cl. .......................................... 119/51, 119/1
[51] Int. Cl. ................................................ A01k 67/00
[58] Field of Search ....................................... 119/1, 51

[56] References Cited

UNITED STATES PATENTS

| | | | |
|---|---|---|---|
| 3,548,785 | 12/1970 | Cooper | 119/1 |
| 3,415,225 | 10/1968 | Collier | 119/1 |
| 3,152,573 | 10/1964 | Kusaka | 119/1 |
| 3,017,182 | 1/1962 | Milan | 273/1 R |

Primary Examiner—Aldrich F. Medbery
Attorney—Harry E. Aine and William J. Nolan

[57] ABSTRACT

The inside wall of the rumen of a ruminant is artificially stimulated for increasing the production of saliva to allow more rapid processing of a relatively greater volume of food. The artificial stimulator comprises a compressible or collapsible resilient structure having a plurality of outwardly directed fingers or prongs for massaging the inside wall of the rumen. The stimulator structure is collapsed and inserted within a retaining tube for oral administration to the ruminant. Once inside the rumen the fluids therein attack the restraining tube to release the stimulator which then expands due to its own resilience to a size sufficiently large to be retained within the rumen for the remaining life of the ruminant.

17 Claims, 5 Drawing Figures

PATENTED JUN 5 1973 3,736,905
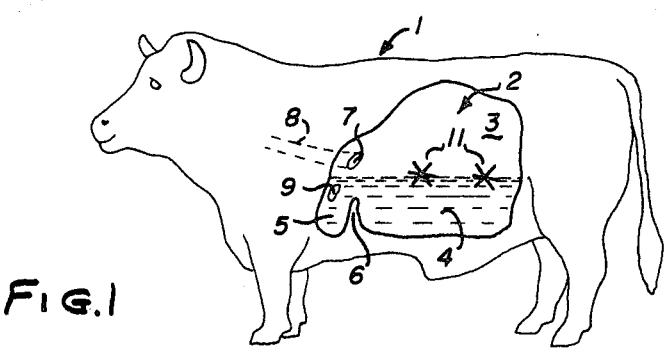
Fig.1
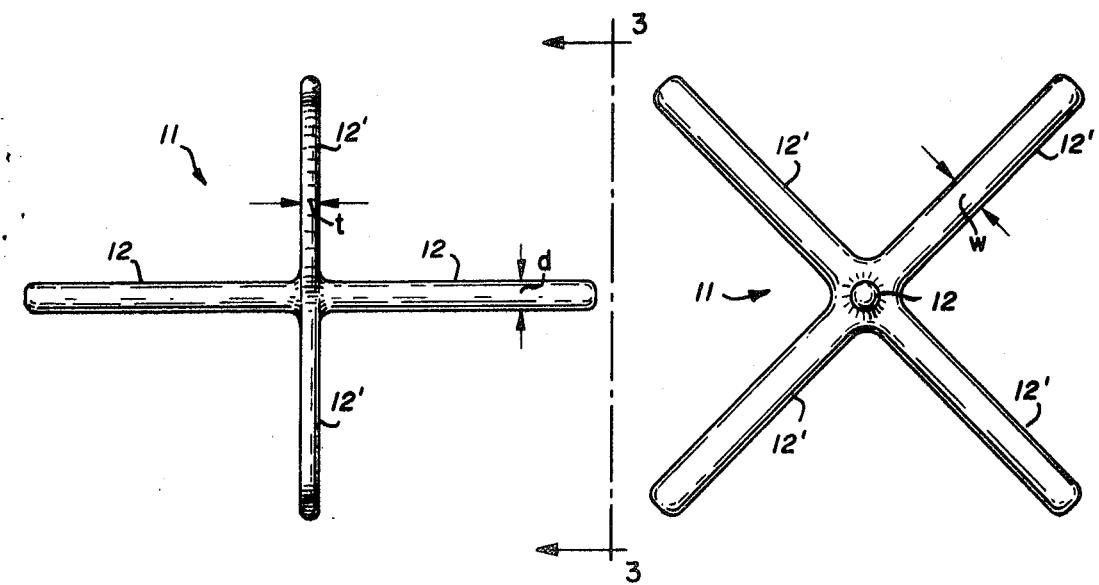
Fig.2  Fig.3
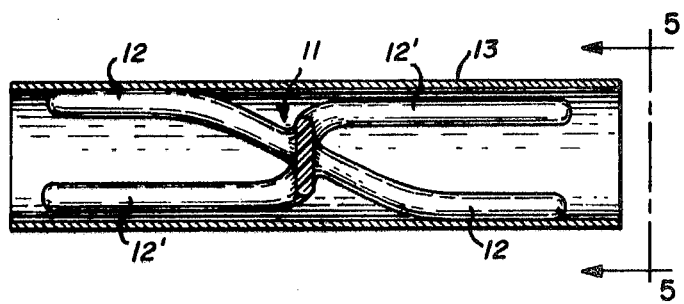  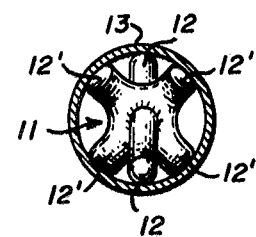
Fig.4  Fig.5

3,736,905

ARTIFICIAL RUMEN STIMULATOR AND METHOD OF ADMINISTERING SAME

DESCRIPTION OF THE PRIOR ART

Heretofore, it has been proposed to orally administer a quantity of relatively light weight, inert bodies or pellets of plastic or other suitable material to a ruminant to stimulate the action of roughage in the ration. The plastic pellets had rough outer surfaces to massage the inside wall of the rumen to stimulate production of saliva for proper processing of relatively concentrated foods by the ruminant.

The problem with this prior method and apparatus, for artificially stimulating the rumen of cattle, is that the pellets are fed in relatively large quantity and are relatively small. Thus, the pellets may be regurgitated for mastication by the ruminant and because they have to be relatively hard and durable this can cause damage to the mouth of the ruminant. Moreover, due to their relatively small size such pellets are not retained within the rumen and are thus lost. Such artificial rumen stimulators are disclosed in U.S. Pat. No. 3,415,225 issued Dec. 10, 1968.

SUMMARY OF THE PRESENT INVENTION

The principal object of the present invention is the provision of an improved artificial rumen stimulator and method of administering same.

In one feature of the present invention, the rumen stimulator includes a compressible or collapsible structure which is compressed for oral administration and which expands within the rumen to free standing dimensions sufficiently large to stimulate the walls of the rumen and to be retained within the rumen for the life of the animal.

In another feature of the present invention, a retaining means is provided for retaining the compressed rumen stimulator in the compressed state for oral administration and for selectively releasing the restraint on the stimulator within the rumen.

In another feature of the present invention, the compressed artificial rumen stimulator is retained in its compressed state by means of an annular retaining structure which is attacked by the fluids within the rumen to break down the retaining structure to effect release and subsequent expansion of the stimulator within the rumen.

In another feature of the present invention, the rumen stimulator includes a plurality of flexible resilient elongated fingers generally outwardly directed of the structure such that the outer free end portions of the fingers engage and massage the inside wall of the rumen for stimulating same.

Other features and advantages of the present invention will become apparent upon a perusal of the following specification taken in connection with the accompanying drawings, wherein:

BRIEF DESCRIPTION OF THE DRAWINGS

FIG. 1 is a side elevational view of a bovine ruminant diagramically showing its rumen with a pair of artificial rumen stimulators of the present invention disposed therein, FIG. 2 is a side elevational view of a rumen stimulator incorporating features of the present invention, FIG. 3 is a view of the structure of FIG. 2 taken along line 3—3 in the direction of the arrows, FIG. 4 is a longitudinal sectional view of a compressed rumen stimulator retained within a retaining structure for oral administration to the ruminant, and FIG. 5 is a view of the structure of FIG. 4 taken along line 5—5 in the direction of the arrows.

DESCRIPTION OF THE PREFERRED EMBODIMENTS

Referring now to FIG. 1, a ruminant 1, such as the bovine species illustrated, has a rumen 2 which is divided generally into a dorsal sac 3 and a ventral sac 4. The reticulum 5 is an anterior, pouch-like extension of the rumen and is separated from the latter by dam-like tissue 6 which is called the rumino-rectricular fold. The cardia 7 is the opening of the esophagus 8 into the stomach and is located generally in partial overlying relationship to the recticulum and anterior portion of the rumen, whereby ingesta swallowed by the animal may enter the rumino-rectricular cavity. The recticulo-omasal orifice 9 provides a passageway for the outflow of content of the rumino-rectricular cavity into the ruminant stomach compartments called the omasum and abomasum (not shown), the latter of which communicates with the small intestine.

A pair of rumen stimulators 11 are shown floating on the liquid content of the rumen. The stimulators 11 preferably having at least a slight degree of buoyancy. The rumen stimulators 11, as more fully disclosed below, each includes a plurality of outwardly directed flexible resilient fingers for massaging the inside walls of the rumen for generally simulating the conditions of roughage within the rumen. Such rumen stimulators 11 promote the flow of saliva and aid digestion to provide for more thorough rapid processing of a relatively greater volume of concentrated food by a ruminant.

Referring now to FIGS. 2 and 3, the artificial rumen stimulator structure 11 is disclosed in greater detail. The rumen stimulator 11 comprises a unitary structure fabricated as by injection molding and having six outwardly directed fingers 12 joined together at their inner ends. The outer ends of the fingers 12 have a generally rounded configuration to massage the inside walls of the rumen 2. The fingers 12 are relatively flexible and resilient such that they may be readily deformed by bending but being sufficiently resilient to return to their original configuration as shown in FIGS. 2 and 3 after the bending force is removed therefrom. The six fingers 12 are arranged in three pairs, each pair having a collinear longitudinal axis which is orthogonally related to the axis of each of the other pair of collinear fingers.

In a typical example, each of the fingers 12 is 2.5 inches in length to provide a minimum overall transverse dimension of the stimulator 11, in any direction, of 5 inches. Four of the fingers 12' lie in a common plane and are of generally rectangular cross section having a width $w$ of 0.250 inch, a thickness $t$ of 0.125 inch and rounded end portions with a radius of curvature of 0.125 inch. The four fingers 12' are joined at their inner ends to each other and to a pair of axially aligned cylindrical fingers 12 as of 0.200 inch in diameter $d$.

The stimulator structure 11 is made of a plastic material which is moderately pliable and resilient and that is inert to the liquids and bacteria encountered within the rumen 2. A suitable plastic material includes polypropylene identification number 7523-natural, marketed by Hercules Inc. of Los Angeles under the trademark "PRO-FAX."

Referring now to FIGS. 4 and 5, the rumen stimulator 11 is shown in the compressed state for oral administration to the ruminant. More particularly, the rumen stimulator structure 11 is collapsed or compressed by collapsing or compressing three of the fingers 12 in one direction and three other ones of the fingers 12 in the other direction and inserting the collapsed simulator structure 11 into the hollow interior of a restraining tube 13, as of paper. The tube 13 has dimensions which may be readily orally administered to the ruminant by feeding or by a balling gun for forceably inserting the collapsed rumen stimulator 11 through the esophagus 8 into the rumen 2. In a typical example, the paper restraining tube 13 has essentially the same glued helical paper construction as the conventional tubular core on which bathroom tissue is wound and such tube 13 being approximately 1 inch in diameter.

Within the rumen, the rumen fluids and bacteria attack the paper and glue of the restraining tube 13 causing the paper tube 13 to open and release the collapsed rumen stimulator 11, which by its own resilience extends or expands to the free standing configuration as shown in FIGS. 2 and 3. As an alternative to the use of a paper tube 13 for constraining the rumen stimulator, the stimulator 11 may be inserted within a gelatin capsule which dissolves within the rumen to release the stimulator structure 11.

It has been found that two such stimulators 11, as shown in FIG. 1, provide sufficient simulation of the rumen such that substantial cost savings are achieved in feeding concentrated food stuffs to feed lot steers for fattening from a weight of approximately 700 lbs. to a weight of 1,050 lbs.

The overall dimensions of the stimulator 11 are such that once the stimulator expands within the rumen the extended overall dimensions of the stimulator are too large to pass through the cardia into the esophagus 8 or to pass from the rumen through the reticulo-omasal orifice 9. Thus, the stimulators 11 are retained within the rumen 2 for the life of the reminant.

In the case of cattle, the stimulator 11 should have expanded overall transverse dimensions greater than 3 inches and preferably about 5 inches. Moreover, the stimulator 11 should be moderately pliable and resilient to provide a massaging action without undue irritation which could otherwise result in causing sores on the inside wall of the rumen.

Although a preferred embodiment of the present invention employs the six-finger stimulator configuration 11 as depicted in FIGS. 2 and 3, it is contemplated that a relatively large variety of different physical configurations could be envisaged employed features of the present invention, namely, that the stimulator be collapsible and that it expand within the rumen to provide a plurality of portions for massaging the inside wall of the rumen. The fingers may be pliable and resilient or merely flexibly and resiliently mounted.

What is claimed is:

1. In an artificial rumen stimulator for oral administration to ruminants for stimulating the walls of the rumen, a compressible resilient rumen stimulator means which is made of a material which is relatively inert to fluids normally found in the rumen, said compressible stimulator means having free standing dimensions too large to be orally administered readily to the ruminant, and having dimensions in the compressed state that will readily allow said compressed stimulator means to be orally administered to the ruminant, said orally administrable resilient stimulator means being extensionable due to its own resilience from the compressed dimensions to essentially the free standing dimensions within the rumen for stimulating the walls of the rumen and for being retained within the rumen.

2. The apparatus of claim 1 including, means for retaining said compressed stimulator means in the compressed state for oral administration to the ruminant and for selectively releasing said stimulator means from the compressed state for expansion thereof within the rumen.

3. The apparatus of claim 2 wherein said retaining means includes a hollow body portion to receive therewithin said compressed rumen stimulator means for oral administration, said hollow body portion being openable by the action of the rumen fluids on said retaining means to release said compressed stimulator means within the rumen.

4. The apparatus of claim 2 wherein said retaining means comprises a tubular member made of paper.

5. The apparatus of claim 1 wherein said rumen stimulator means includes a plurality of flexible resilient elongated fingers generally outwardly directed relative to said stimulator, said fingers having outer end portions for engaging the inside wall of the rumen for stimulating said rumen.

6. An artificial rumen stimulator for more thorough rapid processing of a relatively greater volume of food by a ruminant comprising, an orally administrable structure, said structure being collapsible into a collapsed state for ingestion and being capable of extension from the collapsed state to an extended state within the rumen to engage the inside wall of the rumen for stimulation thereof.

7. The apparatus of claim 6 wherein said structure includes a collapsible portion made of a flexible resilient material.

8. The apparatus of claim 6 wherein said rumen stimulator structure includes a plurality of flexible resilient elongated fingers generally outwardly directed of the structure, said fingers having outer end portions for engaging the inside wall of the rumen for stimulating said rumen.

9. The apparatus of claim 6 wherein the ruminant is of the bovine family and said rumen stimulator structure is dimensioned to be sufficiently large in the extended state to physically prevent passage thereof from the rumen.

10. The apparatus of claim 9 wherein said rumen stimulator in the extended state has minimum overall outside transverse dimensions of at least 3 inches.

11. In a method of stimulating the inside wall of the rumen of a ruminant to negate the necessity for adding roughage to its ration the step of, orally administering to the ruminant at least one collapsed artificial rumen stimulator structure, and extending the administered collapsed stimulator structure within the rumen for engaging the inside wall of the rumen for stimulation thereof.

12. The method of claim 11 including the step of collapsing the rumen stimulator structure, and retaining the stimulator structure in the collapsed state for oral administration.

13. The method of claim 11 wherein said stimulator structure includes a plurality of outwardly extending flexible resilient projections for massaging the inside wall of the rumen.

14. The method of claim 11 wherein said stimulator structure has overall transverse dimensions in the expanded state too large to pass from the rumen.

15. The method of claim 12 wherein the step of retaining the stimulator in the collapsed state for oral administration includes the step of, inserting the collapsed stimulator within an annular retaining structure which is rresponsive to the action of rumen liquids for effecting release of the retaining force of said retaining structure on said stimulator to effect release and extension of said stimulator within the rumen.

16. The method of claim 13 wherein said projections are elongated and orthogonally directed to each other.

17. The apparatus of claim 8 wherein the longitudinal axis of each pair of said elongated fingers lies along a different one of a set of three mutually orthogonal axes.

* * * * *